(12) United States Patent
Eriksson et al.

(10) Patent No.: US 9,242,253 B2
(45) Date of Patent: Jan. 26, 2016

(54) ASSEMBLY WITH MULTIPLE HYDROCYCLONES AND SUPPORT STRUCTURE FOR MULTIPLE HYDROCYCLONES

(71) Applicants: Bengt Eriksson, Nashua, NH (US); Jan Backman, Jarfalla (SE); Karl Gabrielsson, Saltsjo-Boo (SE); Ralf Backvik, Jarfalla (SE)

(72) Inventors: Bengt Eriksson, Nashua, NH (US); Jan Backman, Jarfalla (SE); Karl Gabrielsson, Saltsjo-Boo (SE); Ralf Backvik, Jarfalla (SE)

(73) Assignee: GL&V Luxembourg S.à.r.l., Munsbach (LU)

( * ) Notice: Subject to any disclaimer, the term of this patent is extended or adjusted under 35 U.S.C. 154(b) by 0 days.

(21) Appl. No.: 14/518,867

(22) Filed: Oct. 20, 2014

(65) Prior Publication Data
US 2015/0034543 A1 Feb. 5, 2015

Related U.S. Application Data

(62) Division of application No. 13/319,213, filed as application No. PCT/SE2009/000236 on May 8, 2009, now Pat. No. 8,889,014.

(51) Int. Cl.
| | | |
|---|---|---|
| *B01D 17/038* | (2006.01) | |
| *B04C 5/13* | (2006.01) | |
| *B04C 5/28* | (2006.01) | |
| *B04C 5/12* | (2006.01) | |
| *B04C 5/26* | (2006.01) | |
| *B01D 17/02* | (2006.01) | |

(52) U.S. Cl.
CPC ... *B04C 5/28* (2013.01); *B04C 5/12* (2013.01); *B04C 5/13* (2013.01); *B04C 5/26* (2013.01); *B01D 17/0217* (2013.01); *Y10T 137/0402* (2015.04)

(58) Field of Classification Search
CPC .. B01D 17/0214; B01D 17/0217; B04C 5/12; B04C 5/13; B04C 5/14; B04C 5/26; B04C 5/28; B04C 7/00; Y10T 137/0402
See application file for complete search history.

(56) References Cited

U.S. PATENT DOCUMENTS 2,219,711 A * 10/1940 Marston .................... B04C 5/26
209/712
2,494,465 A * 1/1950 Watson ................... B07B 7/086
209/139.1

(Continued)

*Primary Examiner* — David C Mellon
(74) *Attorney, Agent, or Firm* — James Earl Lowe, Jr.

(57) ABSTRACT

An assembly with hydrocyclones comprising: multiple hydrocyclones having a inlet chamber with two side openings positioned on opposite sides of the inlet chamber and a overflow chamber having two side openings positioned on opposite sides of the overflow chamber. The hydrocyclones are arranged at a support structure, comprising a support bar for support of the hydrocyclones. The hydrocyclones being arranged side by side with their side openings adjacent each other thus forming an inlet pipe by means of the inlet chambers and an overflow pipe by means of the overflow chambers. The inlet chambers and the overflow chambers are adapted to be pressed against each other respectively. The hydrocyclones being arranged in pairs with one of the two hydrocyclones arranged on one side of the support bar and the other on the opposite sides thereof. A method assembling multiple hydrocyclones, wherein hydrocyclones are hung on a support bar at a base end or a head portion and are pressed together, is provided, and a support structure for an assembly of hydrocyclones, comprising a support bar, an end bar and one or two underflow pipes.

22 Claims, 14 Drawing Sheets

(56) References Cited

U.S. PATENT DOCUMENTS

Figure 1:
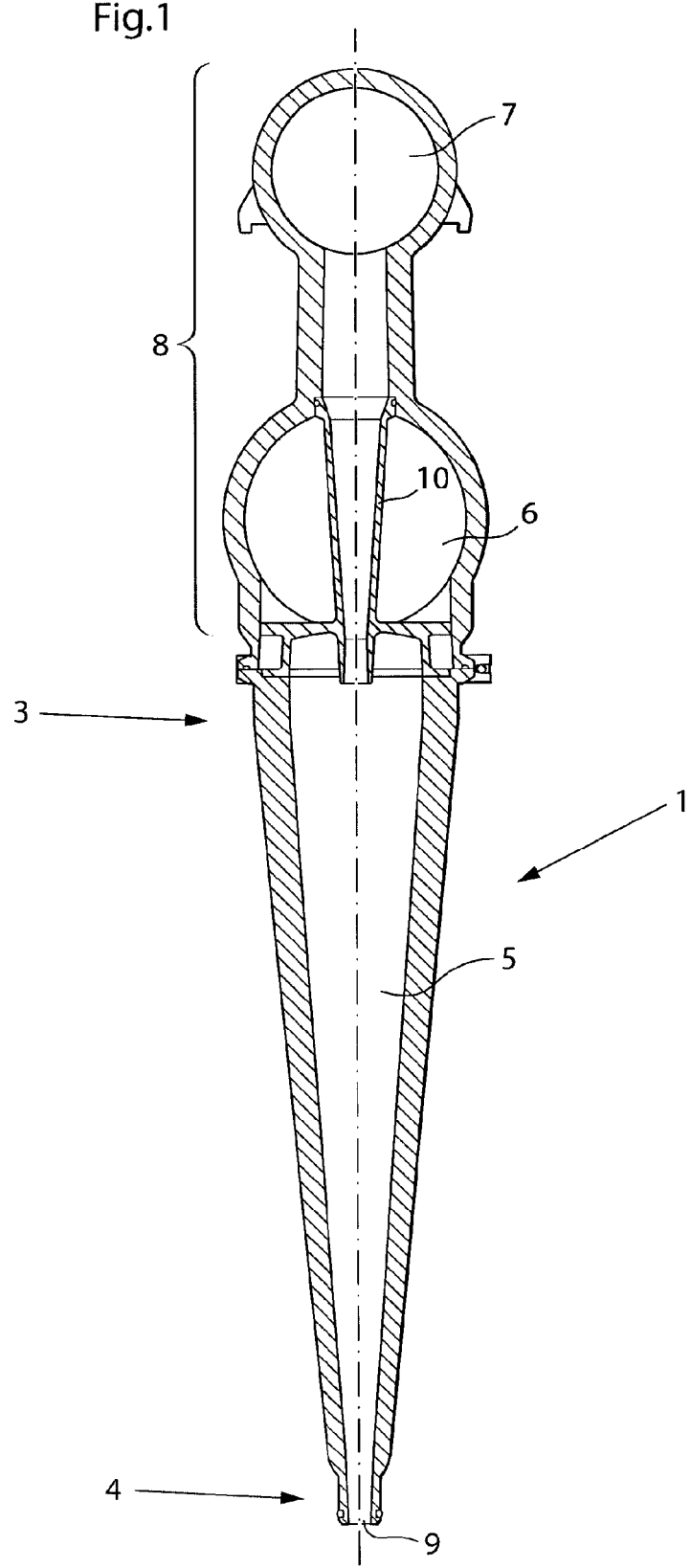

| Patent No. | | Date | Inventor | Classification |
|---|---|---|---|---|
| 2,572,862 | A * | 10/1951 | Israel | B65G 53/06 177/114 |
| 3,862,041 | A * | 1/1975 | Robinson | 210/512.2 |
| 3,959,150 | A * | 5/1976 | Frykhult | B04C 5/24 209/728 |
| 4,197,193 | A * | 4/1980 | Tra | 209/728 |
| 4,462,899 | A * | 7/1984 | Wambsgans | 209/728 |
| 4,572,787 | A * | 2/1986 | Robinson | 210/512.2 |
| 4,605,787 | A * | 8/1986 | Chu | C07C 41/06 568/697 |
| 4,655,923 | A * | 4/1987 | Leone | B04C 5/28 209/728 |
| 4,737,287 | A * | 4/1988 | Prendergast | B04C 5/24 209/728 |
| 5,096,587 | A * | 3/1992 | Charette | 210/512.2 |
| 5,336,411 | A * | 8/1994 | Andersson | B04C 5/24 210/512.1 |
| 6,508,366 | B2 * | 1/2003 | Danger et al. | 209/725 |

\* cited by examiner

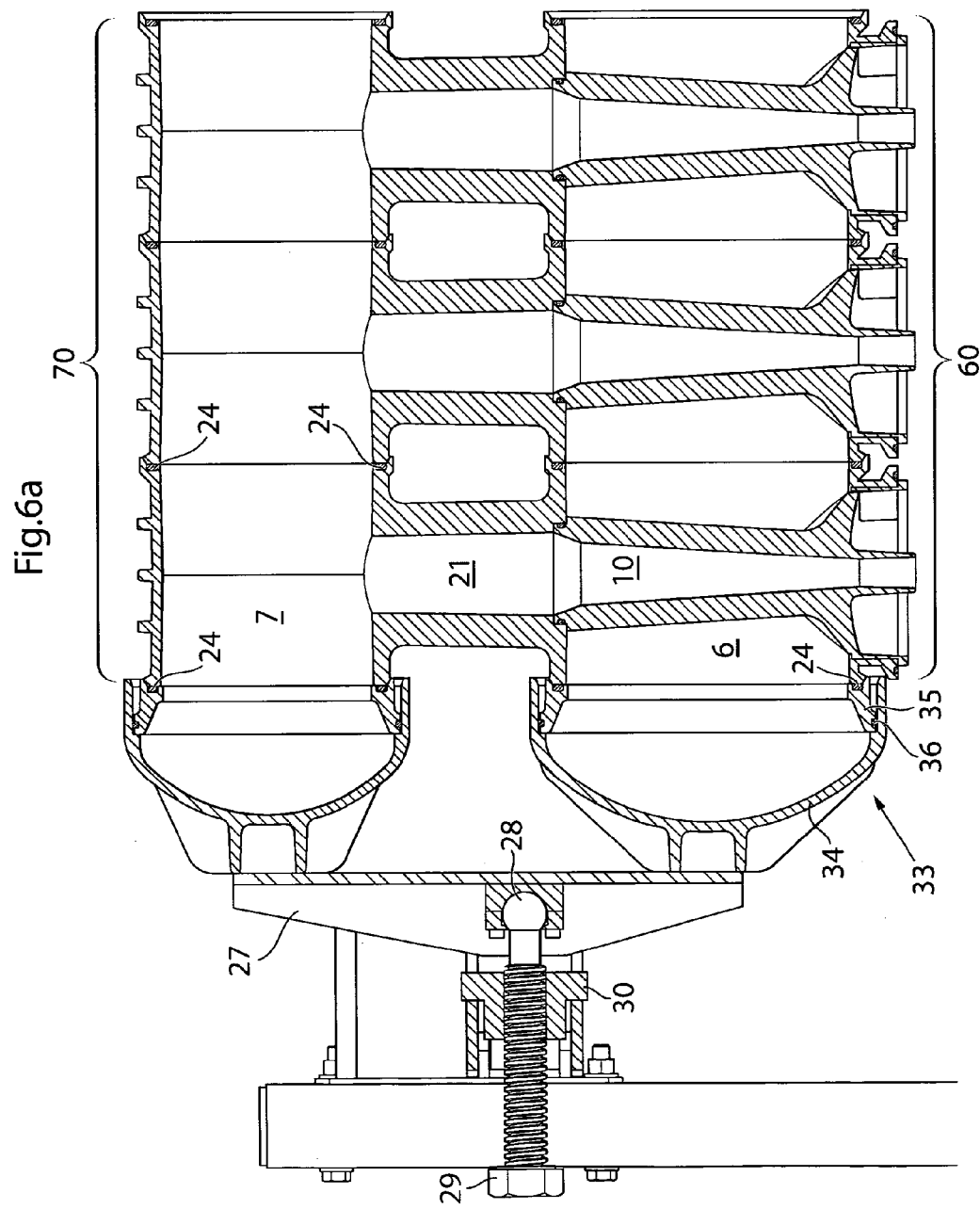

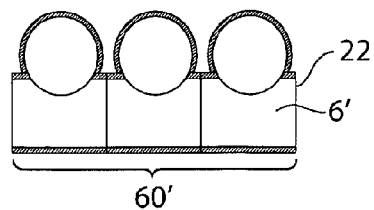
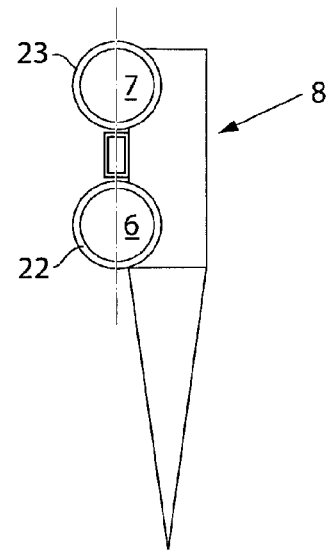
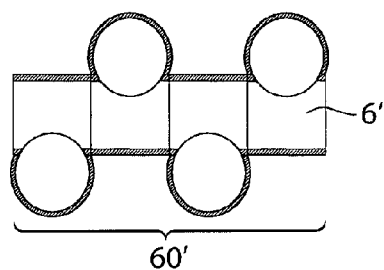
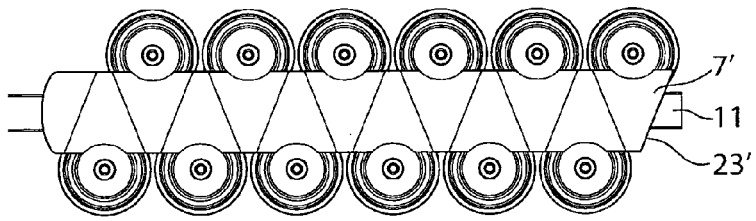
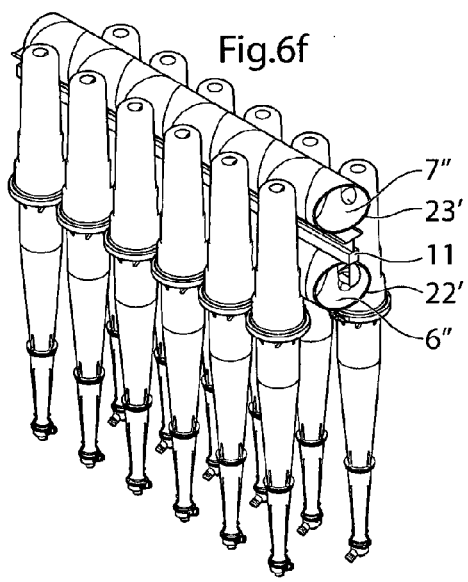
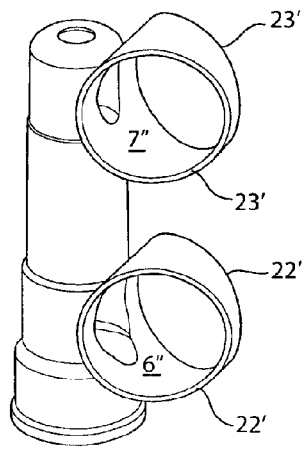

Fig.12
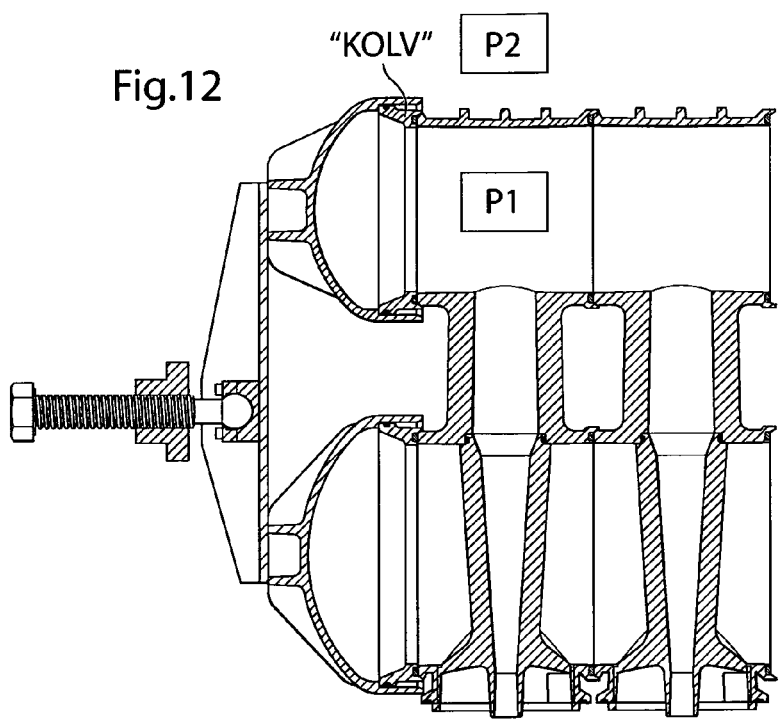
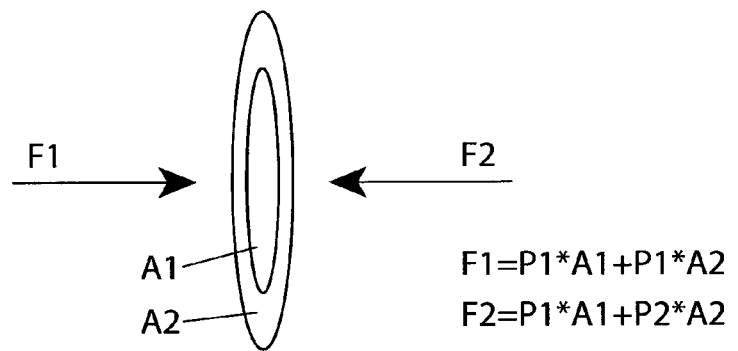
$F1 = P1*A1 + P1*A2$
$F2 = P1*A1 + P2*A2$
Fig.13
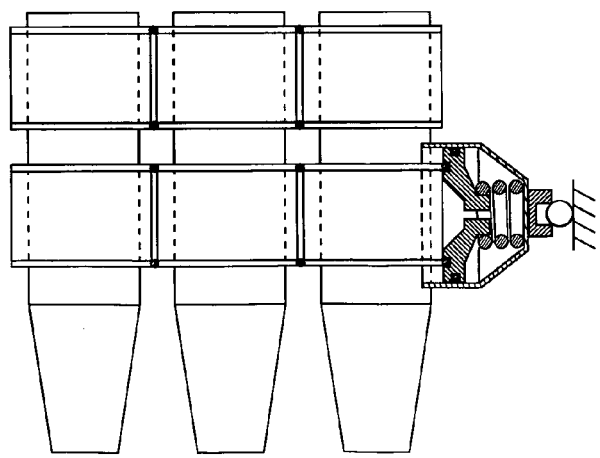

ASSEMBLY WITH MULTIPLE HYDROCYCLONES AND SUPPORT STRUCTURE FOR MULTIPLE HYDROCYCLONES

TECHNICAL FIELD

The present invention concerns an assembly with hydrocyclones and a method of assembling hydrocyclones.

BACKGROUND ART

The present invention is an improved development of the technology described in U.S. Pat. No. 5,336,411. In order to reduce the number of connections and pipes the new idea is also an improved development of the assembly of EP 111743.

SUMMARY OF THE INVENTION

An assembly with hydrocyclones comprising: multiple hydrocyclones having a base end and an apex end, at least an inlet chamber for fluid to be cleaned positioned at the base end, at least an overflow chamber for an overflow portion of the fluid, a separation chamber having an elongated shape between the base end and the apex end and at least an underflow outlet at the apex end. The inlet chamber has at least two side openings positioned on opposite sides of the inlet chamber and the overflow chamber has at least two side openings positioned on opposite sides of the overflow chamber, the side openings at the inlet chamber and the overflow chamber being directed in the same way.

In a first aspect of the invention the hydrocyclones are arranged at a support structure for support of the hydrocyclones. The hydrocyclones being arranged side by side with their side openings adjacent each other thus forming an inlet pipe by means of the inlet chambers and an overflow pipe by means of the overflow chambers. The net chambers forming the inlet pipe and the overflow chambers forming the overflow pipe are adapted to be pressed against each other. By pressing the inlet and overflow chambers against each other a neat assembly is provided where each and every hydrocyclone may easily be exchangeable by simply releasing the pressure and removing the hydrocyclone from the support bar since the adjacent hydrocyclones are not connected to each other, i.e. lacks damping means or similar connectors between each other. Thus, it is also possible for the assembly to be self sealing due to a higher pressure inside the inlet pipe and overflow pipe during use than outside the assembly.

Preferably at least one vortex finder leads to the overflow chamber, and in a more preferred embodiment the at least one vortex finder is positioned inside the inlet chamber.

In one embodiment the overflow chamber is positioned beyond the inlet chamber seen from the base end of the hydrocyclone.

In one embodiment at least an underflow chamber having at least two side openings positioned on opposite sides of the underflow chamber is provided. The side openings at the inlet chamber and the underflow chamber are directed in the same way and the hydrocyclones are arranged side by side with their side openings adjacent each other thus forming an underflow pipe by means of the underflow chambers, the underflow chambers forming the underflow pipe being adapted to be pressed against each other.

In one embodiment the hydrocyclones may be arranged in one row at the support structure. The support structure may comprise a support bar.

Preferably the hydrocyclones may be arranged on both sides of the support structure, thus forming two rows of hydrocyclones. The number of hydrocyclones on each side of the support structure may be different to each other. In one embodiment the hydrocyclones may be arranged in pairs with one of the two hydrocyclones arranged on one side of the support bar and the other on the opposite side thereof.

In one embodiment the support structure may comprise one underflow pipe or two underflow pipes having multiple connection openings for receiving the apex end of the hydrocyclones of the assembly. Preferably, the support bar is positioned at a distance from the underflow pipe/-s more or less corresponding to the length of the hydrocyclones. Thus the hydrocyclones will be supported at both ends.

In an embodiment, the inlet chambers forming the inlet pipe and the overflow chambers forming the overflow pipe are simultaneously pressed towards a main inlet pipe and a main overflow pipe, respectively, by means of a pressing bar arranged at the support structure. The pressing bar may be arranged at a joint and controlled by a screw in order to self adjust the relevant pressure for each of the formed pipes, i.e. inlet pipe and overflow pipe.

In order to make the assembly flexible in size, the pressing bar may be connected to the support structure at more than one different position depending on the number of hydrocyclones arranged in the assembly at the support bar (and underflow pipe in suitable case).

It is also possible to provide the overflow chamber with a second overflow chamber having a second vortex finder leading from said second overflow chamber, through the first overflow chamber to an outlet opening of the first vortex finder.

Preferably, an axial sealing is positioned between each adjacent hydrocyclone around the side openings at the inlet chamber and possibly the overflow and underflow chamber, respectively, depending on the embodiment. Each pipe may also comprise a dosing end portion having an end cap and a piston part. This will improve the tightness of the pipes. If the piston part shows a cross sectional area greater than the area inside the pipe a self sealing performance may be achieved due to a higher inner pressure in the pipe during use than outside of the pipe. It is also conceivable to use radial seals between each adjacent hydrocyclone.

In a second aspect of the invention an assembly with hydrocyclones comprises: multiple hydrocyclones having a base end and an apex end, at least an inlet chamber for fluid to be cleaned positioned at the base end, at least an overflow chamber for an overflow portion of the fluid, a separation chamber having an elongated shape between the base end and the apex end and at least an underflow outlet at the apex end. The overflow chamber is positioned at the apex end. The inlet chamber having at least two side openings is positioned on opposite sides of the inlet chamber. The hydrocyclones are arranged at a support structure for support of the hydrocyclones, the hydrocyclones being arranged side by side with their side openings adjacent each other thus forming an inlet pipe by means of the inlet chambers, whereby the inlet chambers forming the inlet pipe are being adapted to be pressed against each other.

In one embodiment the overflow chamber has at least two side openings positioned on opposite sides of the overflow chamber, the side openings at the inlet chamber and the overflow chamber being directed in the same way and the hydrocyclones being arranged side by side with their side openings adjacent each other thus forming an overflow pipe by means of the overflow chambers, the overflow chambers forming the overflow pipe being adapted to be pressed against each other.

In one embodiment at least an underflow chamber having at least two side openings positioned on opposite sides of the underflow chamber is provided. The side openings at the inlet chamber and the underflow chamber are directed in the same way and the hydrocyclones are arranged side by side with their side openings adjacent each other thus forming an underflow pipe by means of the underflow chambers, the underflow chambers forming the underflow pipe being adapted to be pressed against each other.

The overflow chamber may be integrated inside the underflow chamber according to one embodiment.

Preferably at least one vortex finder leads to the overflow pipe, and in a more preferred embodiment the at least one vortex finder leads through the underflow chamber to the overflow pipe.

It is also conceivable to provide an outlet for overflow both at the base end and the apex end of the hydrocyclone.

In one embodiment the hydrocyclones are arranged in one row at the support structure. The support structure may comprise a support bar.

Preferably the hydrocyclones may be arranged on both sides of the support structure, thus forming two rows of hydrocyclones. The number of hydrocyclones on each side of the support structure may be different to each other. In one embodiment the hydrocyclones may be arranged in pairs with one of the two hydrocyclones arranged on one side of the support bar and the other on the opposite side thereof.

In one embodiment the support structure may comprise one underflow pipe or two underflow pipes having multiple connection openings for receiving the apex end of the hydrocyclones of the assembly. Preferably, the support bar is positioned at a distance from the underflow pipe/-s more or less corresponding to the length of the hydrocyclones. Thus the hydrocyclones will be supported at both ends.

Regardless of the type of hydrocyclones and the type of arrangement, the hydrocyclones are preferably hung on the support structure.

Regardless of the type of hydrocyclones, they are preferably made of polymer material. Thus they can be produced cost efficiently. The polymer material will also expand by the raised temperature of the fluid to be cleaned and thus add to the tightness of the inlet and overflow pipes formed by the adjacent inlet and overflow chambers.

Preferably, an axial sealing is positioned between each adjacent hydrocyclone around the side openings at the inlet chamber and possibly the overflow and underflow chamber, respectively, depending on the embodiment. Each pipe may also comprise a closing end portion having an end cap and a piston part. This will improve the tightness of the pipes. If the piston part shows a cross sectional area provided outside the area of the inside of the pipe a self sealing performance may be achieved due to a higher inner pressure in the pipe during use than outside of the pipe. The piston part may be slidable in the end cap. It is also conceivable to use radial seals between each adjacent hydrocyclone.

According to a third aspect of the present invention a method of assembling hydrocyclones is provided where the hydrocyclones are hung on a support structure at a base end or a head portion and are pressed together.

According to a fourth aspect of the present invention a support structure is provided comprising a support bar, an end bar and one or two underflow pipes.

SHORT DESCRIPTION OF THE DRAWINGS

Figure 2:
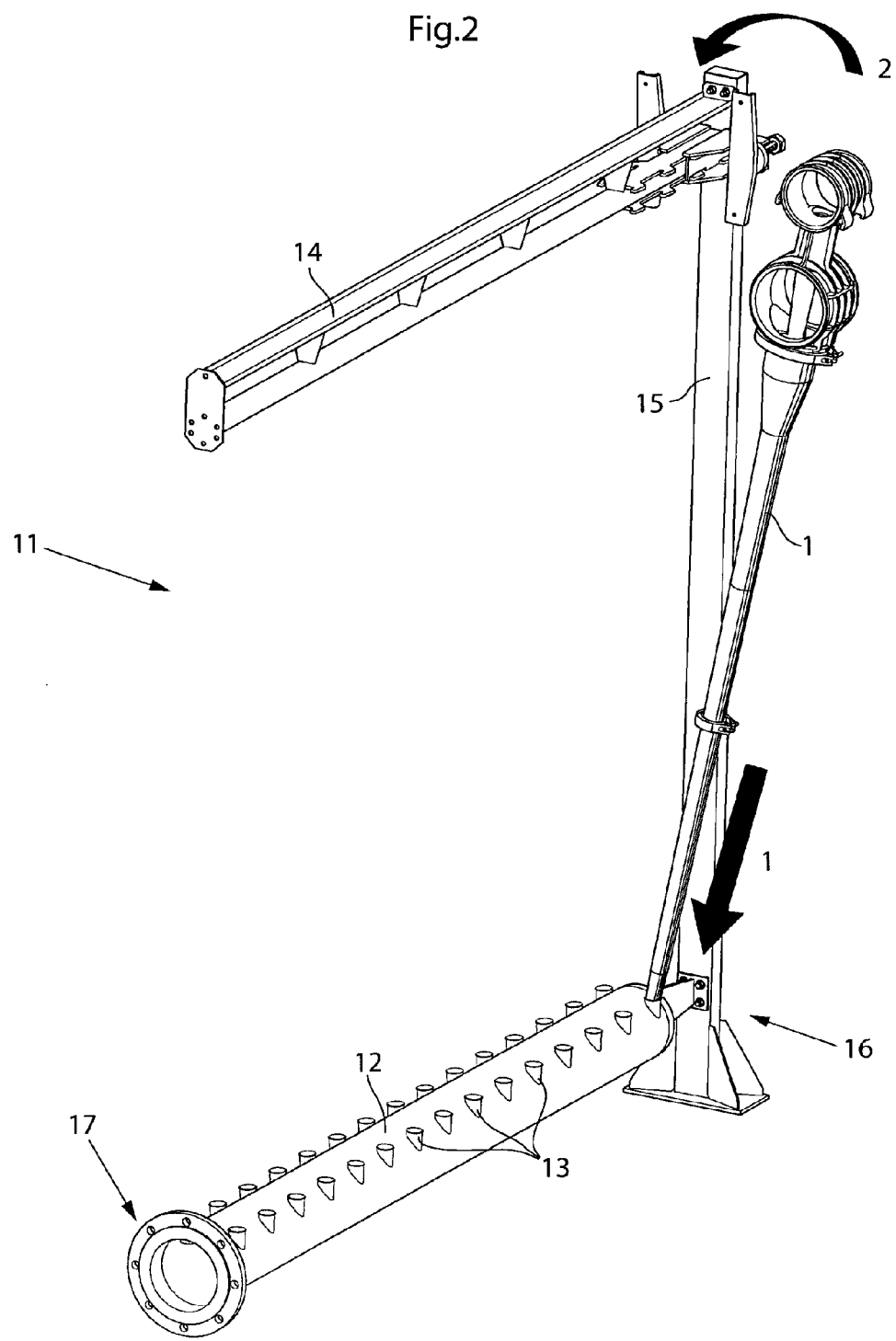
Figure 3:
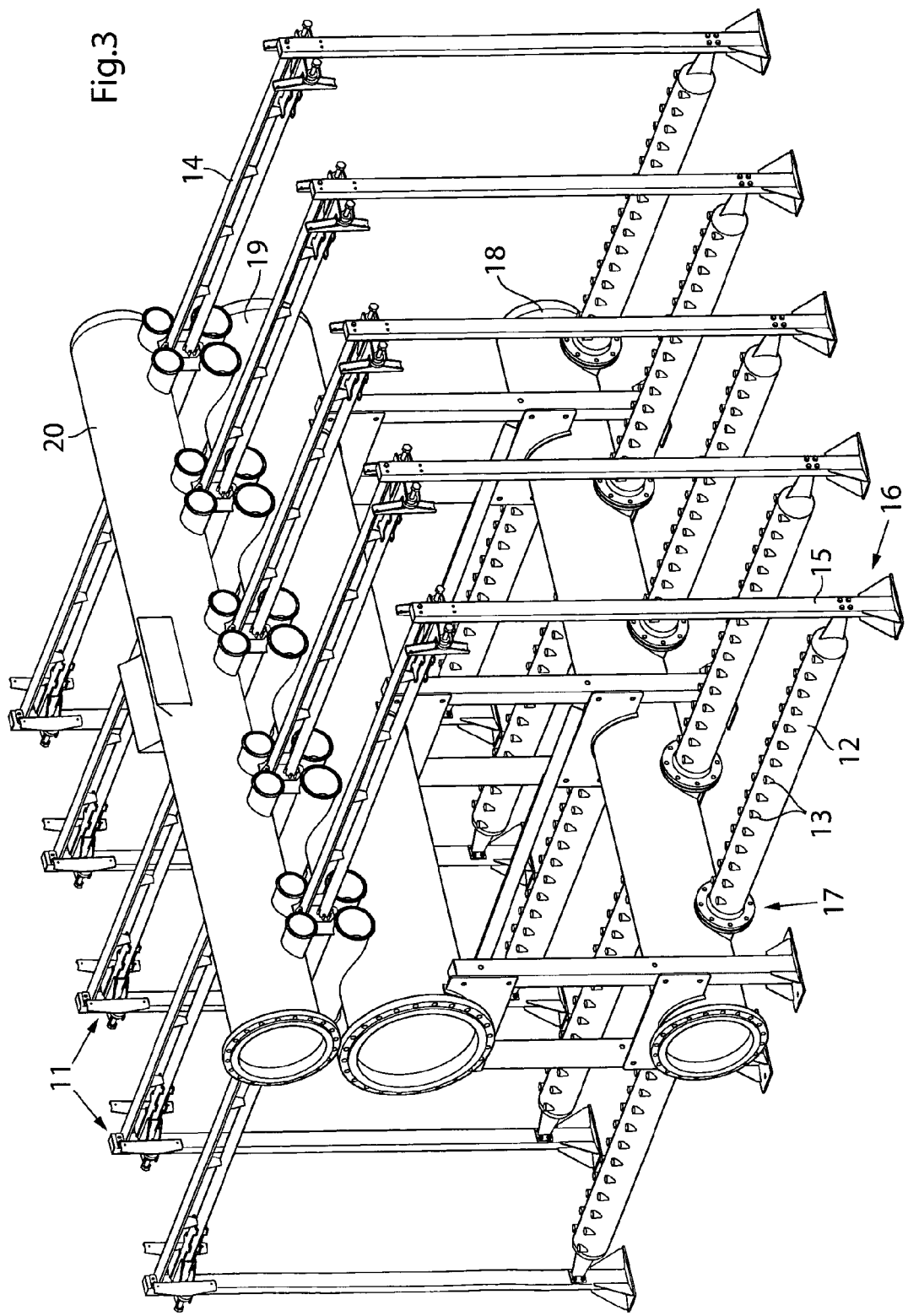
Figure 4:
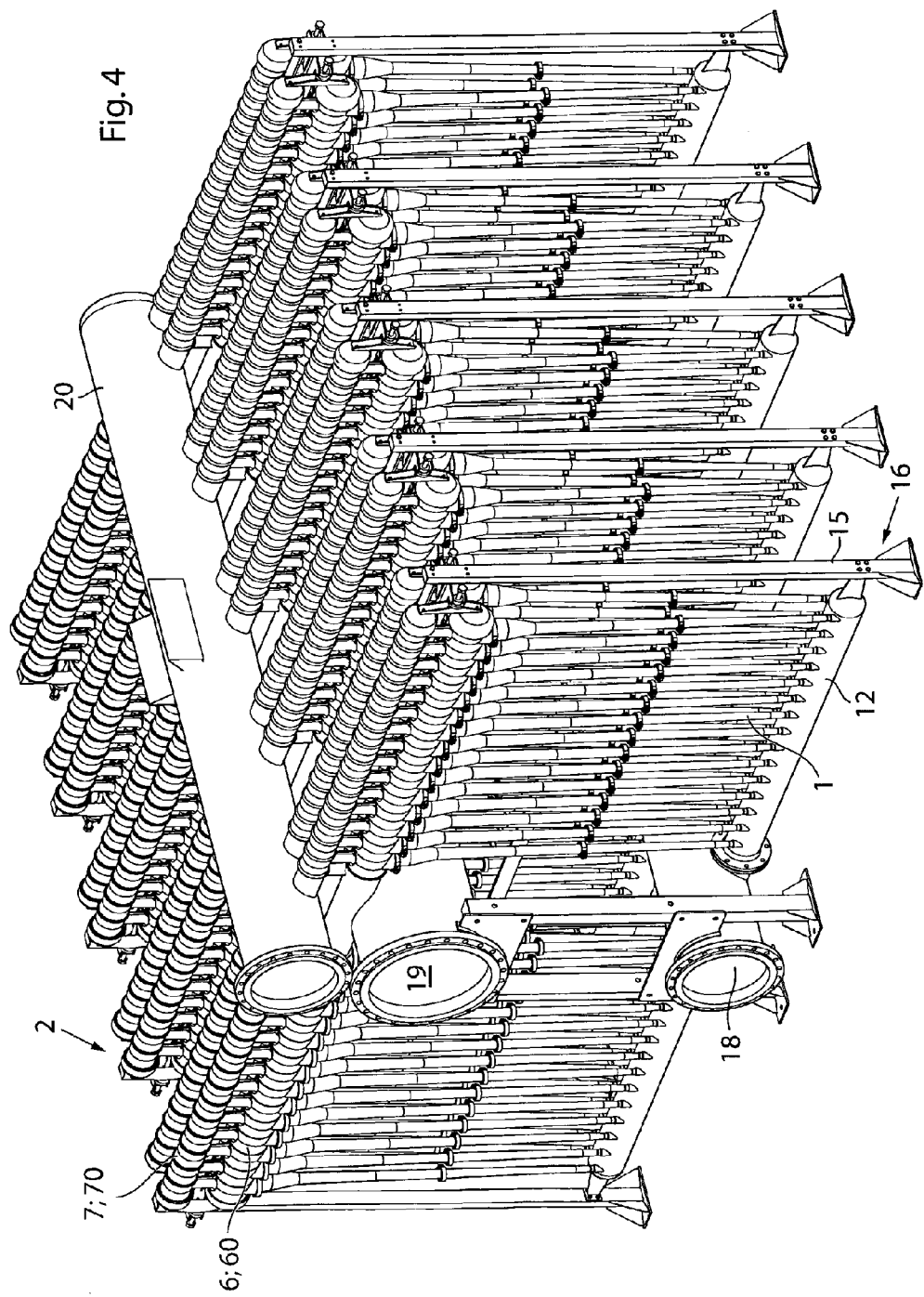
Figure 5:
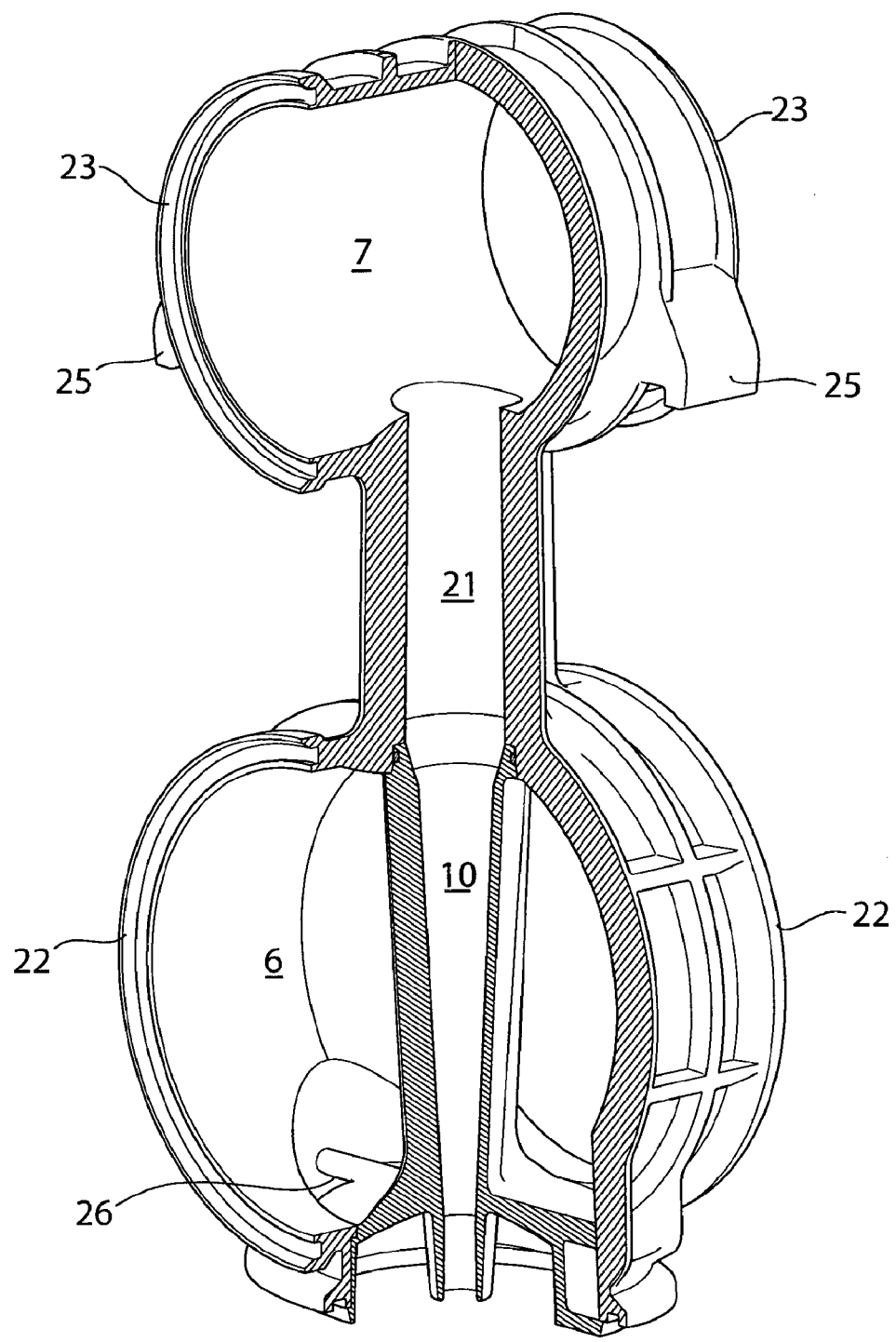
Figure 7:
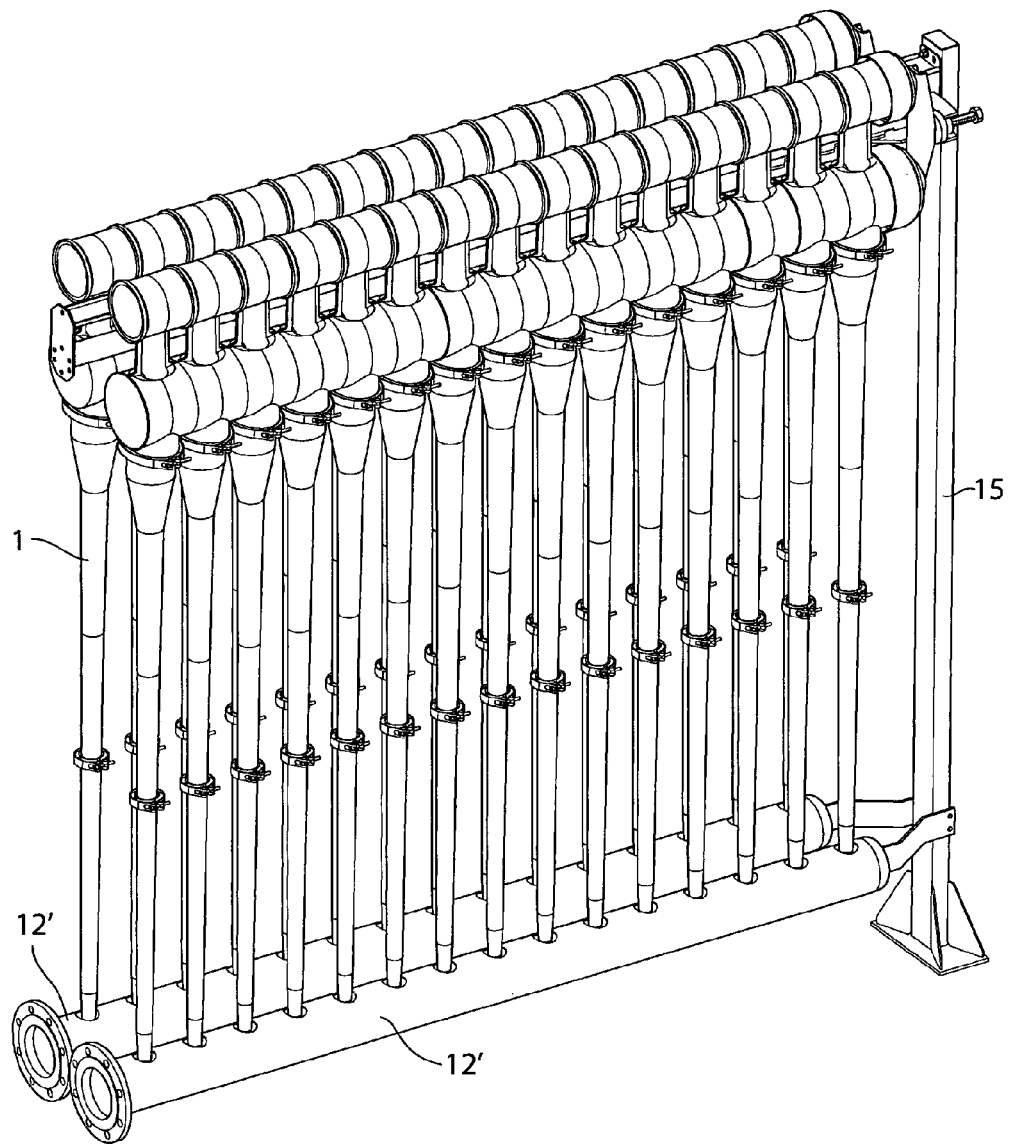
Figure 8:
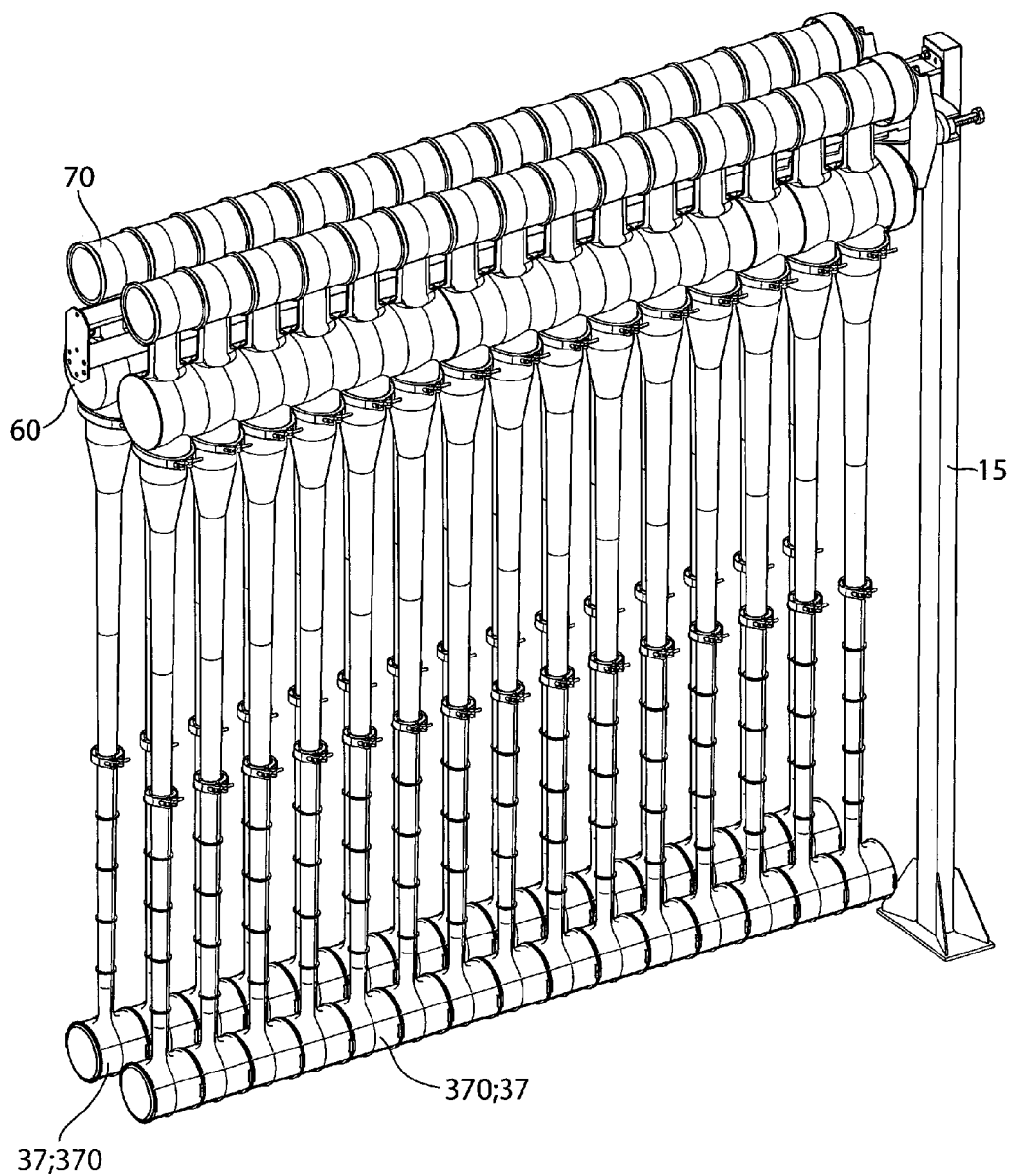
Figure 9:
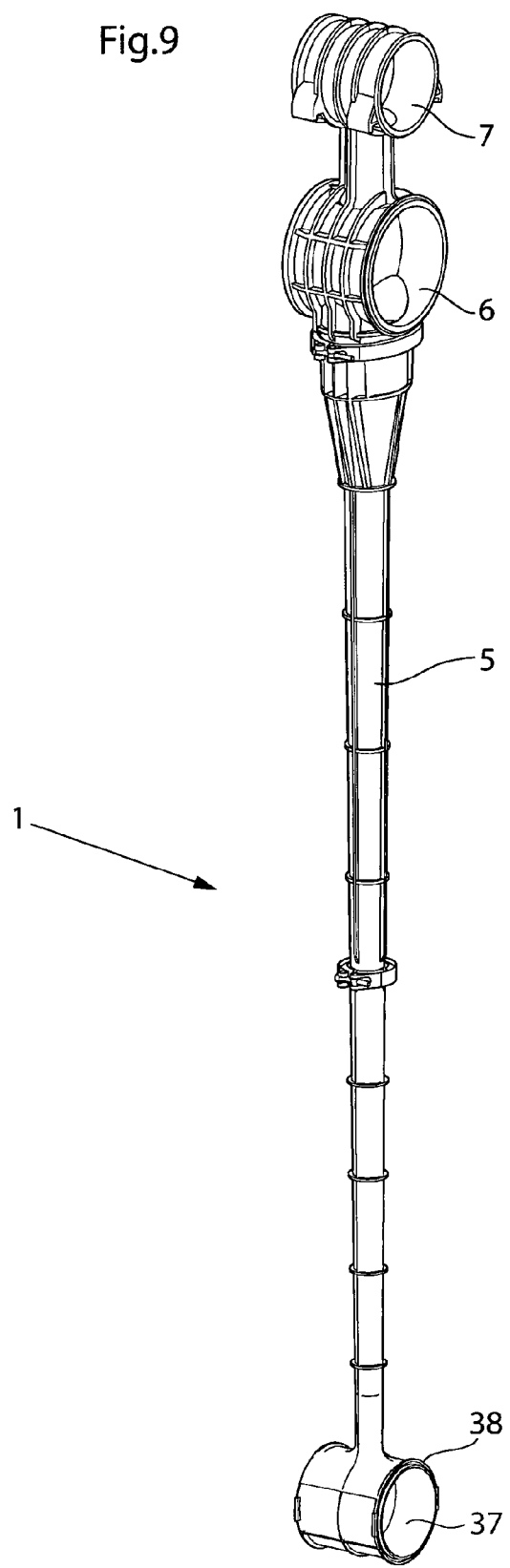
Figure 10:
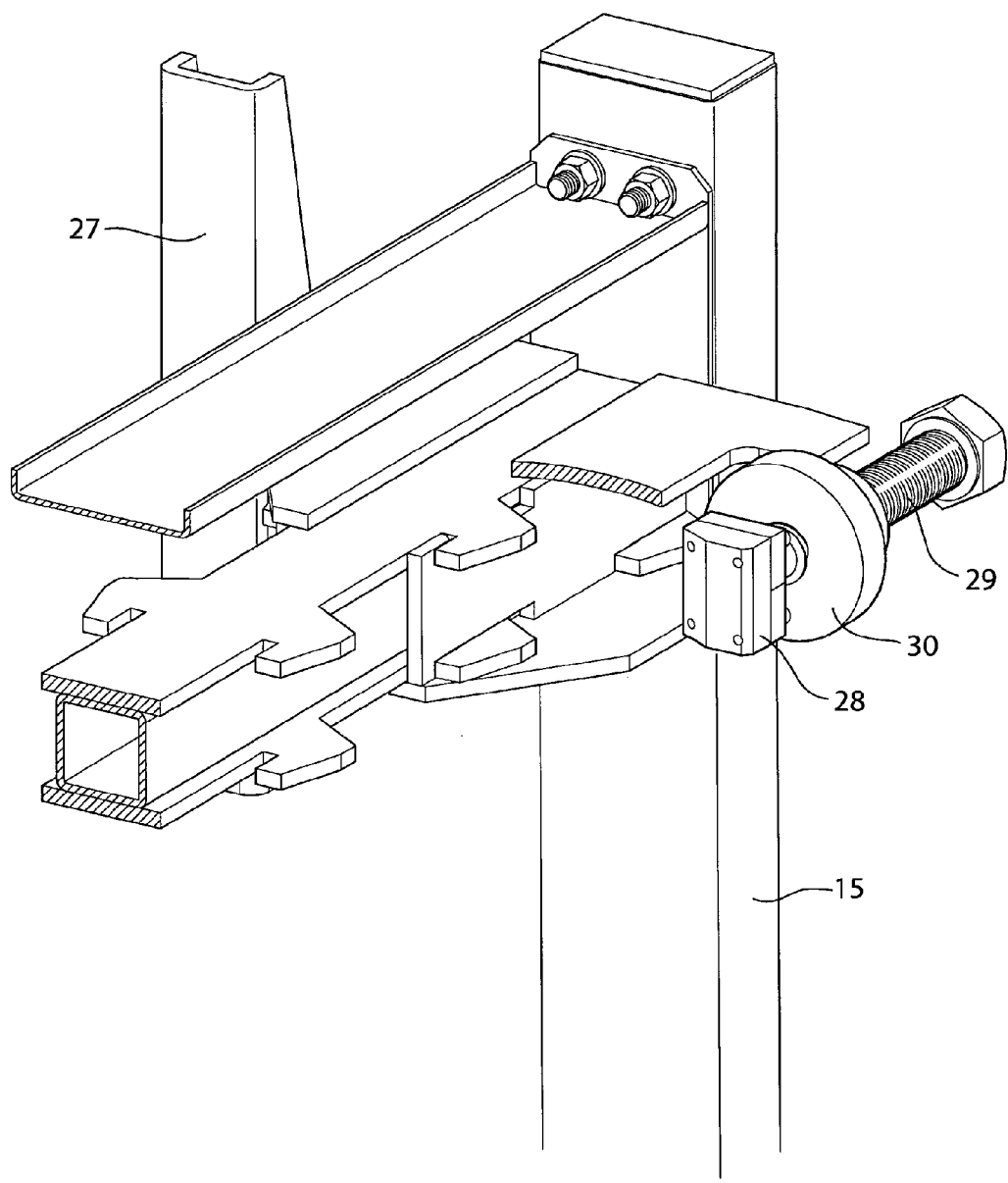
Figure 11:
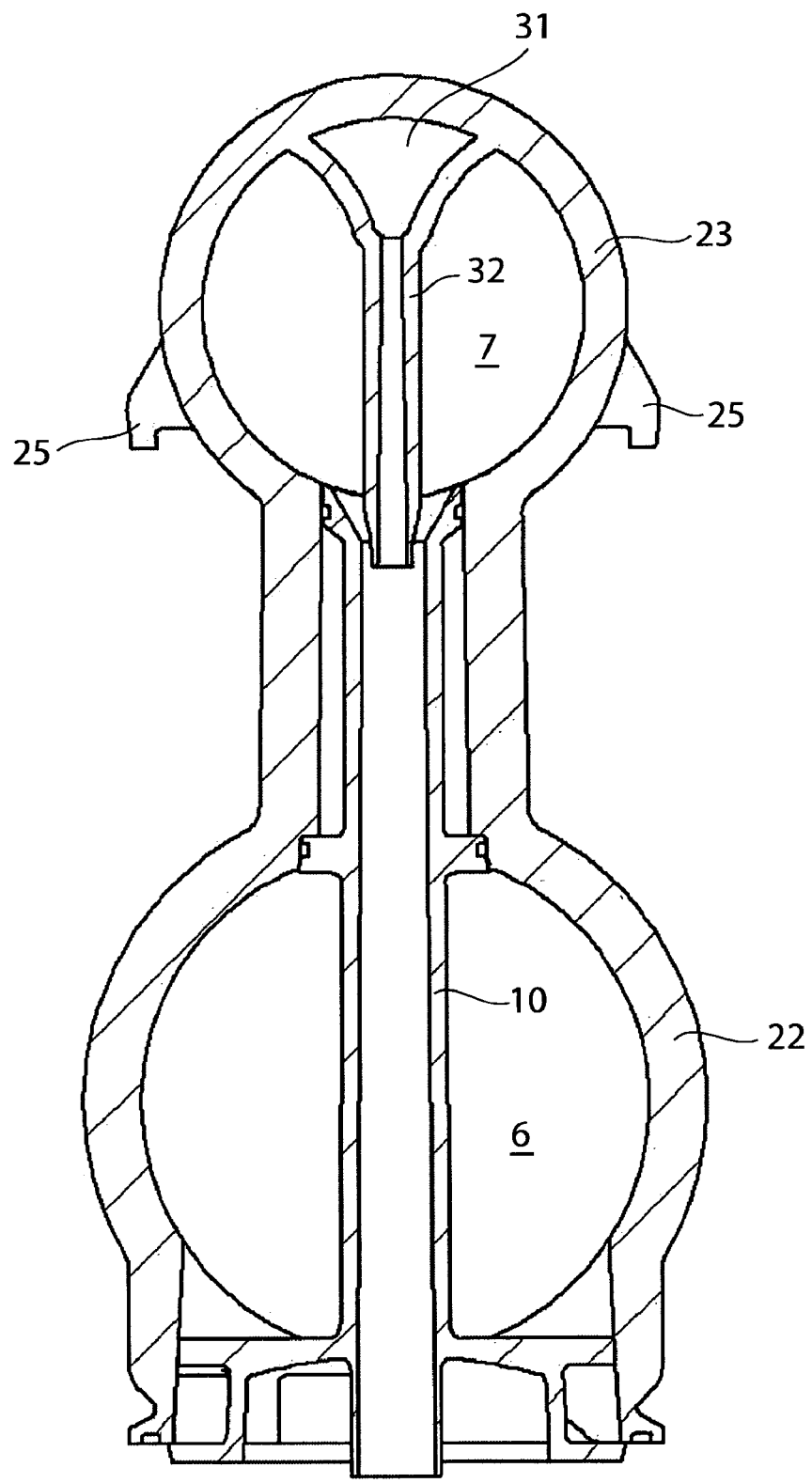
Figure 14:
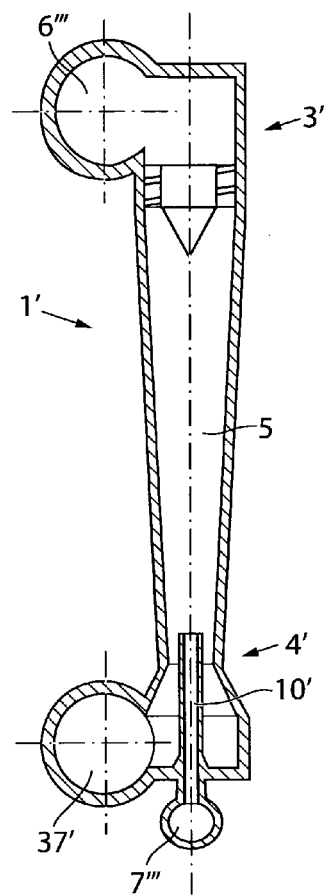
Figure 15:
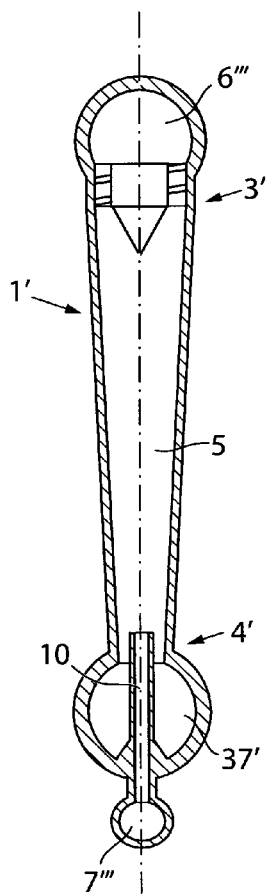
Figure 16:
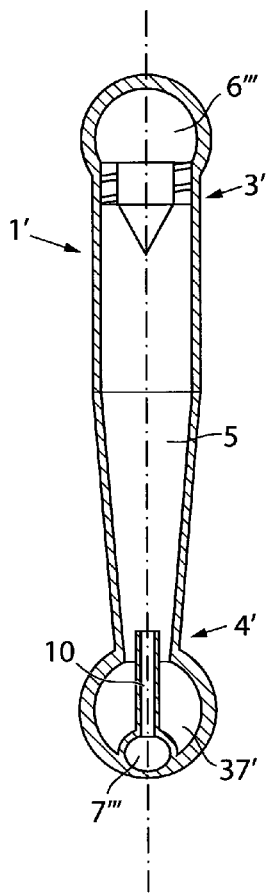

The present invention will now be described in more detail by means of embodiments with referral to the accompanying drawings, in which FIG. 1 shows one embodiment of a hydrocyclone suitable for the assembly of the invention, FIG. 2 shows one embodiment of a support structure for the assembly and a hydrocyclone under mounting, FIG. 3 shows several support structures of FIG. 2 in conjunction with main pipes in a fluid cleaning system, FIG. 4 shows a fluid cleaning system comprising several assemblies of one embodiment of the present invention, FIG. 5 shows one embodiment of a head portion of a hydrocyclone suitable for the assembly, FIG. 6a, shows one embodiment with three hydrocyclones adjacent each other forming a portion of an inlet pipe and an overflow pipe, FIG. 6b, shows one embodiment of an enlarged inlet chamber in a cross sectional view from above, FIG. 6c, shows one embodiment of an enlarged inlet chamber in a cross sectional view from the side, FIG. 6d, shows one embodiment of an enlarged inlet chamber in a cross sectional view from above, FIG. 6e, shows one embodiment of an enlarged inlet chamber in a cross sectional view from above, FIG. 6f, shows one embodiment in a perspective view, FIG. 6g, shows the head portion of a hydrocyclone according to the embodiment of FIG. 6f, FIG. 7 shows one embodiment of the support structure with hydrocyclones mounted thereon, FIG. 8 shows one embodiment of the assembly according to the present invention, FIG. 9 shows one embodiment of a hydrocyclone suitable for the assembly of the invention, FIG. 10 shows a detail of the support structure allowing for flexibility in the number of hydrocyclones for the assembly, FIG. 11 shows one embodiment of a head portion of a hydrocyclone suitable for the assembly, FIG. 12 shows a figure of principle for a self sealing design of one embodiment of a dosing end portion, FIG. 13 shows one embodiment of a dosing end portion, FIG. 14 shows one embodiment of a hydrocyclone suitable for the assembly of the invention, FIG. 15 shows one embodiment of a hydrocyclone suitable for the assembly of the invention, and FIG. 16 shows one embodiment of a hydrocyclone suitable for the assembly of the invention.

DETAILED DESCRIPTION OF EMBODIMENTS
OF THE PRESENT INVENTION

In FIG. 1 one embodiment of a hydrocyclone 1 suitable for the assembly 2 of the present invention is shown. The hydrocyclone has a base end 3 and an apex end 4 and there between a separation chamber 5 having an elongated shape between the base end 3 and the apex end 4. At the base end 3 an inlet chamber 6 for fluid to be cleaned is positioned and an overflow chamber 7 for an overflow portion of the fluid is positioned outside the inlet chamber 6 in the longitudinal direction of the hydrocyclone I. The portion of the hydrocyclone 1 at the base end 3 comprising at least an inlet and at least an overflow outlet is usually called the head portion 8 of the hydrocyclone 1. At least an underflow outlet 9 is positioned at the apex end 4 and at least a vortex finder 10 positioned inside the inlet chamber 6 leading to the overflow chamber 7. The hydrocyclone may be of either the forward cleaning type or reverse cleaning type. It is also conceivable that the hydrocyclones comprise further inlets, for example for dilution, and other connections.

In FIG. 2 it is shown how a hydrocyclone 1 is easily mounted in a support structure 11 for an assembly 2 according to the present invention. The support structure 11 comprises an undertow pipe 12 having multiple connection openings 13 for receiving the apex end 4 of the hydrocyclones 1. The support structure 11 further comprises a support bar 14, preferably positioned parallel to the underflow pipe 12, for support of the hydrocyclones 1. An end bar 15 may connect the support bar 14 and the underflow pipe 13 in one end, a distal end 16, and the opposite end 17 of the underflow pipe 12 is adapted to be connected to a main pipe for underflow 18, see FIG. 3. The support bar 14 is preferably positioned at a suitable distance from the underflow pipe 12 corresponding to the length of the hydrocyclones 1, for example so the head portion 8 of the hydrocyclone 1 may be supported by the support bar 14.

In FIG. 3 several support structures 11 are connected to main pipes of a processing plant. The main pipes may comprise a main underflow pipe 18, a main inlet pipe 19 and a main overflow pipe 20. The support bars 14 are preferably fixed to any or both of the main inlet pipe 19 and main overflow pipe 20. FIG. 4 shows an example of a whole system comprising a main inlet pipe 19, a main overflow pipe 20, a main underflow pipe 18 and ten assemblies 2 of hydrocyclones 1.

An embodiment of a head portion 8 of a hydrocyclone 1 is shown in FIG. 5. As previously described the head portion 8 comprises an inlet chamber 6, an overflow chamber 7 and a vortex finder 10 leading overflow from the separation chamber 5 of the hydrocyclone 1 to the overflow chamber 7, through the inlet chamber 6 but inside the vortex finder 10. In the shown embodiment also a canal 21 is provided between the vortex finder 10 and the overflow chamber 7. An inlet canal 26 leads the fluid to be cleaned from the inlet chamber 6 to the separation chamber 5, preferably in a tangential manner.

The inlet chamber 6 has two side openings 22 positioned on opposite sides of the inlet chamber 6 and the overflow chamber 7 has two side openings 23 positioned on opposite sides of the overflow chamber 7. The side openings 22, 23 at the inlet chamber 6 and the overflow chamber 7 being directed in the same direction. Support means 25 are preferably arranged at opposite sides of the head portion 8, in the present embodiment at the outside of the overflow chamber 7. The supporting means may be directed perpendicular to the direction of the side openings 22, 23. Preferably seals 24 are arranged at the rim of the side openings 22, 23.

In FIG. 6a, it is shown how the hydrocyclones 1 being arranged side by side with their side openings 22, 23 adjacent each other thus forming an inlet pipe 60 by means of the inlet chambers 6 and an overflow pipe 70 by means of the overflow chambers 7. The inlet chambers 6 forming the inlet pipe 60 and the overflow chambers 7 forming the overflow pipe 70 are adapted to be pressed against a main inlet pipe 19 and a main overflow pipe 20, respectively. The seals 24 are preferably axial seals 24 along the axis of the built up inlet pipe 60 and overflow pipe 70, respectively. The seals may instead be radial seals if so desired.

In FIGS. 6b, and 6c, a variant is shown where the inlet chambers 6' are additionally protruding from the hydrocyclones forming larger inlet chambers 6'. The side openings 22 are positioned opposite each other and when the hydrocyclones are arranged side by side they form an inlet pipe 60'. A further variant is shown in the embodiment in FIG. 6d, where the hydrocyclones are arranged side by side in an alternating fashion whereby the hydrocyclones are positioned on both sides of the inlet pipe 60'. In FIG. 6e, still another embodiment is shown having net chambers 6" additionally protruding from the hydrocyclones and having side openings 22' opposite each other. In this embodiment the side openings 22' are slightly angled to the axis perpendicular to the direction of the inlet pipe 60" but up by the inlet chambers 6". Preferably the side openings 22' are slightly angled in opposite directions on the opposite sides so that when they are arranged side by side in an alternating fashion the inlet pipe 60" bunt up by the inlet chambers 6" be straight. In this way a more compact assembly can be provided compared to the embodiments shown in FIGS. 6b, and d. It is also conceivable to have the same type of overflow chambers 7', 7" as the inlet chambers 6', 6" in the FIGS. 6b-e,, which is shown in the embodiment in FIGS. 6f, and 6g.

In FIG. 6a, it is also shown an embodiment of a pressing bar 27 arranged in connection with the support bar 14, possibly via the end bar 15. The pressing bar 27 presses the hydrocyclones 1 together towards the main pipes 19, 20 thereby forming the inlet pipe 60 and overflow pipe 70. The pressing bar 27 uses the support bar 14 as a tension bar. In the shown embodiment, the pressing bar 27 is connected via a joint 28 to the support bar 14. A screw 29 is used for tensioning. The screw 29 passes through a bracket 30, which is attached at the support bar 14. The joint 28 comprises an end of the screw 29 and a portion of the pressing bar 27. The joint 28 is flexible at least in the vertical direction in order to self adjust the pressing bar 27 and thus convey the relevant pressure to the inlet pipe 60 and the overflow pipe 70, respectively.

One way of benefit of the possibility to have self sealing property of the assembly 2 is to provide a dosing end portion 33 having an end cap 34 and a piston part 35. The piston part 35 may be sealed axially with an axial seal 24 towards the hydrocyclones 1 of the assembly 2 and radially with a radial seal 36 towards the end cap 34. A sketch of principle is shown in FIG. 12. A1 is the internal cross sectional area inside the pipe, which will give the same force attribution to F1 and F2. A2 is the ring area, i.e. the cross sectional area made up by the difference in area between the pipe and inside the end cap 34. Since P1 is greater than P2 also F1 will be greater than F2. F1 will tend to push the piston part 35, which may glide inside the end cap 34 due to the higher pressure inside the built up inlet pipe 60 and overflow pipe 70 during use than the outside pressure and will further press the hydrocyclones 1 together and towards the main inlet pipe 19 and main overflow pipe 20. The piston part 35 may preferably show a cross sectional area perpendicular to the length axis of the pipe for the force from the internal pressure to press on, i.e. A2. This can be provided by having the radial seal 36 at a larger diameter than the axial seals 24, thus making up a cross sectional area at the piston part 35. The end cap 34 also functions as a seal for the outermost side opening 22, 23 in the last hydrocyclone 1 in an assembly 2.

An embodiment of a closing en portion 33' is shown in FIG. 13. In this embodiment a spring is provided inside of the end cap 34 in order to provide pretension to minimize influence of creeping of the polymer material when such material is used.

In FIG. 7 a second embodiment of the support structure 11 is shown together with a number of hydrocyclones 1 arranged at the support structure. In this embodiment there are two underflow pipes 12', preferably arranged in parallel.

A second embodiment of the assembly of the present invention is shown in FIG. 8. A second embodiment of a hydrocyclone, see FIG. 9, comprises an underflow chamber 37 having two side openings 38 positioned on opposite sides of the underflow chamber 37. The side openings 38 at the underflow chamber 37 are directed in the same direction as the side openings 22, 23 at the inlet chamber 6 and the overflow chamber 7. When the hydrocyclones 1 are being arranged side by side, the side openings 38 adjacent each other thus form an underflow pipe 370 by means of the underflow chambers 37 and are adapted to be pressed against each other. A second support bar (not shown) may be arranged at the underflow pipe 370, preferably in between the two rows of hydrocyclones 1, together with a press bar (not shown) for pressing the underflow chambers 37 together and towards a main underflow pipe 18, in a similar manner as described above for the inlet pipe 60 and overflow pipe 70. Instead it is conceivable to arrange drawstrings in order to press the underflow chambers 37 together (not shown). The underflow pipe 370 may also comprise an end portion having an end cap and a piston part. The piston part may be sealed axially with an axial seal towards the hydrocyclones 1 of the assembly 2 and radially with a radial seal towards the end cap. Thus, the piston part may glide inside the end cap due to the higher pressure inside the built up underflow pipe 370 during use and further press the hydrocyclones 1 together and towards the main inlet pipe 18. The piston part may preferably show a cross sectional area for the force from the internal pressure to press on Cf the inlet pipe 60 and overflow pipe 70.

Instead of using an end bar 15 it is possible to support the support bar 14 in any other way, such as a support string from the ceiling. It is also conceivable to lead the underflow in any other way to the main underflow pipe 18, such as via individual tubings (not shown).

The pressing bar 27 may via its bracket 30 be attached to the support bar 14 at more than one position in order to provide a flexible solution where the number of hydrocyclones 1 may be changed by adding or removing hydrocyclones 1 at the outer end of the built up inlet pipe 60 and overflow pipe 70, see FIG. 10.

In FIG. 11 a further embodiment of a hydrocyclone 1 suitable for the assembly 2 according to the present invention is shown. Added to the inlet chamber 6 and overflow chamber 7 is a second overflow chamber 31. In the shown embodiment the second overflow chamber 31 is provided inside the first overflow chamber 7 although it is conceivable to provide the second overflow chamber 31 outside of the first overflow chamber 7. A second vortex finder 32 is provided from the opening of the first vortex finder 10 (or canal 21) in the first overflow chamber 7, through the first overflow chamber 7 and opens into the second overflow chamber 31. Otherwise it corresponds to the previously described hydrocyclone 1.

In FIG. 14 one embodiment of a hydrocyclone 1' is shown suitable for the assembly 2 of the present invention. The hydrocyclone 1' has a base end 3' and an apex end 4' and there between a separation chamber 5' having an elongated shape between the base end 3' and the apex end 4'. At the base end 3' an inlet chamber 6''' for fluid to be cleaned is positioned. At least an underflow chamber 37' and at least one overflow chamber 7''' are positioned at the apex end 4'. A vortex finder 10' positioned inside the apex end 4' leads the overflow to the overflow chamber 7'''. The hydrocyclone may be of either the forward cleaning type or reverse cleaning type. It is also conceivable that the hydrocyclones comprise further inlets, for example for dilution, and other connections.

In FIG. 15 one embodiment of a hydrocyclone 1' is shown where an underflow chamber 37' is provided. Preferably a vortex finder 10' leads through the underflow chamber 37, to an overflow chamber 7'''.

The overflow chamber 7''' may be integrated inside the underflow chamber 37' according to one embodiment shown in FIG. 16. Preferably a vortex finder 10' leads through the underflow chamber 37' to the overflow pipe.

It is also conceivable to have outlets for both or one of overflow and underflow, respectively, for example connected via tubings to the main pipes, instead of chambers building up pipes. It is also possible to provide for an outlet for overflow both at the base end and the apex end of the hydrocyclone.

The hydrocyclone 1' may be provided in accordance with the different embodiments described above.

The invention claimed is:

1. An assembly with hydrocyclones comprising: a plurality of hydrocyclones, each of the hydrocyclones having a base end and an apex end, at least an inlet chamber for fluid to be cleaned positioned at the base end, at least an overflow chamber for an overflow portion of the fluid, a separation chamber having an elongated shape between the base end and the apex end, at least an underflow outlet at the apex end, the inlet chamber having at least two side openings positioned on opposite sides of the inlet chamber and the overflow chamber having at least two side openings positioned on opposite sides of the overflow chamber, the side openings at the inlet chamber and the overflow chamber being directed along parallel axes, the plurality of hydrocyclones being arranged at a support structure for support of the hydrocyclones, the support structure including a support bar, the plurality of hydrocyclones being arranged side by side adjacent the support bar with respective inlet chamber side openings adjacent each other thus forming an inlet pipe by means of the inlet chambers and an overflow pipe by means of the overflow chambers, the inlet chambers forming the inlet pipe and the overflow chambers forming the overflow pipe being adapted to be pressed against each other, and a pressing bar attached to the support bar for pressing the hydrocyclones against each other.

2. An assembly according to claim 1, wherein in each of the hydrocyclones at least one vortex finder leads to the overflow chamber.

3. An assembly according to claim 2, wherein in each of the hydrocyclones the at least one vortex finder is positioned inside the inlet chamber.

4. An assembly according to claim 2, wherein in each of the hydrocyclones the overflow chamber is positioned beyond the inlet chamber seen from the base end of the hydrocyclone.

5. An assembly with hydrocyclones comprising: a plurality of hydrocyclones, each of the hydrocyclones having a base end and an apex end, at least an inlet chamber for fluid to be cleaned positioned at the base end, at least an overflow chamber for an overflow portion of the fluid, a separation chamber having an elongated shape between the base end and the apex end and at least an underflow outlet at the apex end, the overflow chamber being positioned at the apex end, the inlet chamber having at least two side openings positioned on opposite sides of the inlet chamber, the plurality of hydrocyclones being arranged at a support structure for support of the hydrocyclones, the support structure including a support bar, the plurality of hydrocyclones being arranged side by side adjacent the support bar with respective inlet chamber side openings adjacent each other thus forming an inlet pipe by means of the inlet chambers, the inlet chambers forming the inlet pipe being adapted to be pressed against each other, and a pressing bar attached to the support bar for pressing the hydrocyclones against each other.

6. An assembly according to claim 5, wherein in each of the hydrocyclones the overflow chamber having at least two side openings positioned on opposite sides of the overflow chamber, the side openings at the inlet chamber and the overflow chamber being directed along parallel axes and the hydrocyclones being arranged side by side with their side openings adjacent each other thus forming an overflow pipe by means of the overflow chambers, the overflow chambers forming the overflow pipe being adapted to be pressed against each other.

7. An assembly according to claim 5, wherein in each of the hydrocyclones at least an underflow chamber having at least two side openings positioned on opposite sides of the underflow chamber, the side openings at the inlet chamber and the underflow chamber being directed along parallel axes and the hydrocyclones being arranged side by side with their side openings adjacent each other thus forming an underflow pipe by means of the underflow chambers, the underflow chambers forming the underflow pipe being adapted to be pressed against each other.

8. An assembly according to claim 6, wherein in each of the hydrocyclones an overflow chamber is integrated inside the underflow chamber.

9. An assembly according to claim 6, wherein in each of the hydrocyclones at least one vortex finder leads to an overflow chamber.

10. An assembly according to claim 9, wherein in each of the hydrocyclones the vortex finder leads through the underflow chamber to the overflow chamber.

11. An assembly according to claim 5, wherein a plurality of the hydrocyclones are arranged on one side of the support bar and another plurality of the hydrocyclones are arranged on an opposite side of the support bar.

12. An assembly according to claim 11, wherein the pluralities of hydrocyclones are arranged in pairs, with the pair having one hydrocyclone from each of the pluralities of hydrocyclones, with one hydrocyclone of each pair of hydrocyclones being arranged on one side of the support bar and the other hydrocyclone of the pair of hydrocyclones being arranged on the opposite side of the support bar.

13. An assembly according to claim 5, wherein the support structure comprises one underflow pipe or two underflow pipes having multiple connection openings for receiving the apex end of the hydrocyclones of the assembly.

14. An assembly according to claim 5, wherein the hydrocyclones are hung on the support structure.

15. An assembly according to claim 5, wherein in each of the hydrocyclones the inlet chambers form the inlet pipe and the overflow chambers form an overflow pipe are simultaneously pressed towards a main inlet pipe and a main overflow pipe, respectively, by means of the pressing bar arranged at the support structure.

16. An assembly according to claim 15, wherein the pressing bar is arranged at a joint and controlled by a screw in order to self adjust a relevant pressure for each of the inlet pipe and overflow pipe.

17. An assembly according to claim 15, wherein the pressing bar is connectable to the support structure at more than one position.

18. An assembly according to claim 5, wherein an axial seal is positioned between each adjacent hydrocyclone around the side openings at the inlet chamber.

19. An assembly according to claim 5, wherein the inlet pipe also comprises a closing end portion having an end cap and a piston part.

20. An assembly according to claim 19, wherein the piston part, which is slidable in the end cap, has a cross sectional area provided outside an inner area of the pipe.

21. An assembly according to claim 5, wherein in each of the hydrocyclones the overflow chamber is provided with a second overflow chamber having a second vortex finder leading from said second overflow chamber, through the first overflow chamber to an outlet opening of the first vortex finder.

22. An assembly according to claim 5, wherein the hydrocyclones are made of polymer material.

* * * * *